United States Patent
Drumm et al.

[19]

[11] Patent Number: 6,021,704
[45] Date of Patent: Feb. 8, 2000

[54] BRAKING FORCE AMPLIFIER

[75] Inventors: Stefan Drumm, Saulheim; Thomas Berthold, Darmstadt; Alfred Eckert, Bodenheim, all of Germany

[73] Assignee: ITT Manufacturing Enterprises Inc., Wilmington, Del.

[21] Appl. No.: 08/894,427

[22] PCT Filed: Feb. 24, 1996

[86] PCT No.: PCT/EP96/00770

§ 371 Date: Nov. 17, 1997

§ 102(e) Date: Nov. 17, 1997

[87] PCT Pub. No.: WO96/28329

PCT Pub. Date: Sep. 19, 1996

[30] Foreign Application Priority Data

Mar. 14, 1995 [DE] Germany ............ 195 09 065

[51] Int. Cl.[7] ................................. F15B 9/10
[52] U.S. Cl. .................... 91/369.2; 91/376 R
[58] Field of Search ................. 91/369.1, 369.2, 91/376 R

[56] References Cited

U.S. PATENT DOCUMENTS

| | | | |
|---|---|---|---|
| 5,293,808 | 3/1994 | Rueffer et al. | 91/376 R X |
| 5,487,325 | 1/1996 | Bayliss et al. | 91/376 R |
| 5,605,088 | 2/1997 | Balz et al. | 91/376 R X |
| 5,647,462 | 7/1997 | Tsubouchi et al. | 91/376 R X |
| 5,845,556 | 12/1998 | Tsubouchi et al. | 91/376 R X |

FOREIGN PATENT DOCUMENTS

| | | |
|---|---|---|
| 0 379 329 | 7/1990 | European Pat. Off. . |
| 0 616 932 | 9/1994 | European Pat. Off. . |
| 36 27 279 | 3/1987 | Germany . |
| 44 00 688 | 2/1991 | Germany . |
| 59-128038 | 7/1984 | Japan . |
| 59-186755 | 10/1984 | Japan . |

OTHER PUBLICATIONS

Patent Abstracts of Japan, vol. 8, no.253 (M–339), 11–20–84.

Patent Abstracts of Japan, vol. 9, no.46 (M–360), 10–23–84.

*Primary Examiner*—Hoang Nguyen
*Attorney, Agent, or Firm*—Rader, Fishman & Grauer PLLC

[57] ABSTRACT

A brake power booster is equipped with a device for determining an input force introduced at a brake pedal. According to the present invention, the device which uses a pressure generator for measuring the input force is interposed between the end of an actuating rod, connected to the brake pedal, and a valve piston that actuates a control valve of the brake power booster. The pressure generator is exposed to the effect of a pressure which develops in a pressure chamber and is built up in an elastic substance or an elastomer.

6 Claims, 3 Drawing Sheets

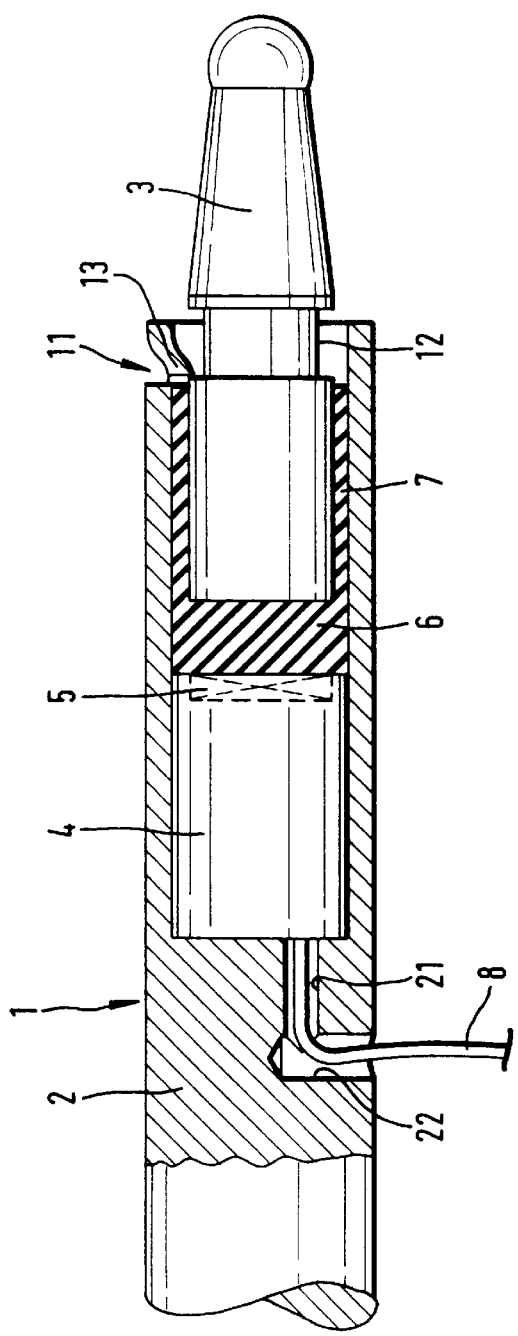
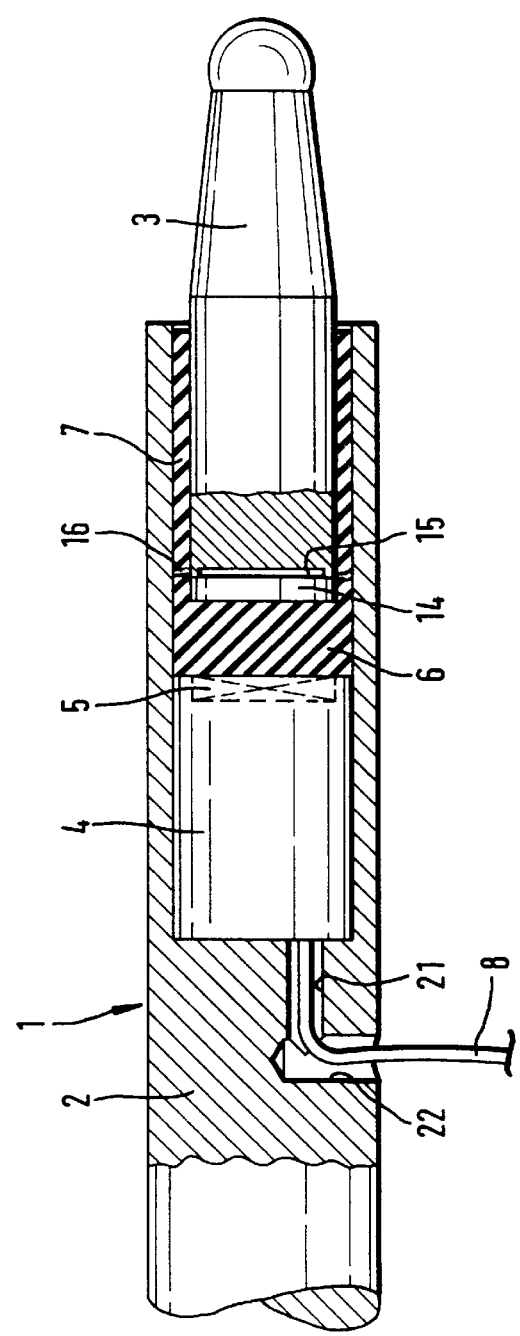

BRAKING FORCE AMPLIFIER

BACKGROUND OF THE INVENTION

The present invention relates to a brake power booster including an actuating rod which is in force-transmitting connection with an actuating pedal, and a device for determining an input force, applied to the actuating pedal, which has a pressure chamber that interacts with a pressure generator and is filled with an elastic substance.

A brake power booster disclosed in German Patent No. 42 08 496 includes a device for determining the actuating force introduced at the brake pedal. The device includes force sensors configured as resistance strain gauges or load cells arranged at the brake pedal which can be realized by pressure-responsive resistors or piezoelectric materials. This means that the pedal force is sensed outside the booster housing. Both sensor types must be calibrated individually. This makes them inappropriate for application in large-series production for cost reasons.

In another brake power booster disclosed in German patent application No. 36 27 279, the actuating force introduced at the brake pedal is determined by way of the pressure which develops in an elastic part upon actuation. For this purpose, there is provision of a piston which bears against the elastic part and is displaceable axially within limits. The piston interacts with a pressure sensor which issues signals proportional to the magnitude of the input force. In order to protect the pressure sensor against damage when very high pedal forces prevail, the pressure sensor is so arranged as to be slidable within limits in an axial direction, counteracting the effect of a compression spring, in opposition to the actuating direction of the brake power booster. A disadvantage in the prior art brake power booster is that, for realization of the principle of determining the input force illustrated, extensive constructive modifications are required in the area of the force transmission between the actuating rod and an output force delivering member. These modifications necessitate considerable effort and structure.

Therefore, an object of the present invention is to disclose arrangements which permit sensing the input force introduced at the actuating pedal without constructive modifications to the force transmission area inside the booster housing. The sensing operation shall be effected at low cost and without necessitating large mounting space.

SUMMARY OF THE INVENTION

In a first solution of this objective, the pressure chamber filled with the elastic substance and the pressure generator are arranged between two telescopically slidable parts of the actuating rod having a bipartite design.

A second solution of the above mentioned objective in a brake power booster, having an actuating rod which interacts with a valve piston of a control valve, includes that the device for determining the input force is arranged in the valve piston and that the transmission of forces from the actuating rod to the elastic substance is effected by way of a pressure member which defines the pressure chamber axially.

A third solution of the objective to be achieved by the present invention includes that the device for determining the input force is a force generator which is arranged in the valve piston coaxially to the actuating rod. Preferably, forces are transmitted from the actuating rod to the force generator by way of an intermediate piece.

The present invention will be explained in detail in the following description of four embodiments, making reference to the accompanying drawings.

BRIEF DESCRIPTION OF THE DRAWINGS

In the drawings,

FIGS. 1–3 are views of a first, second and third embodiment of the subject matter of the present invention.

DETAILED DESCRIPTION OF THE DRAWINGS

Figure 1:
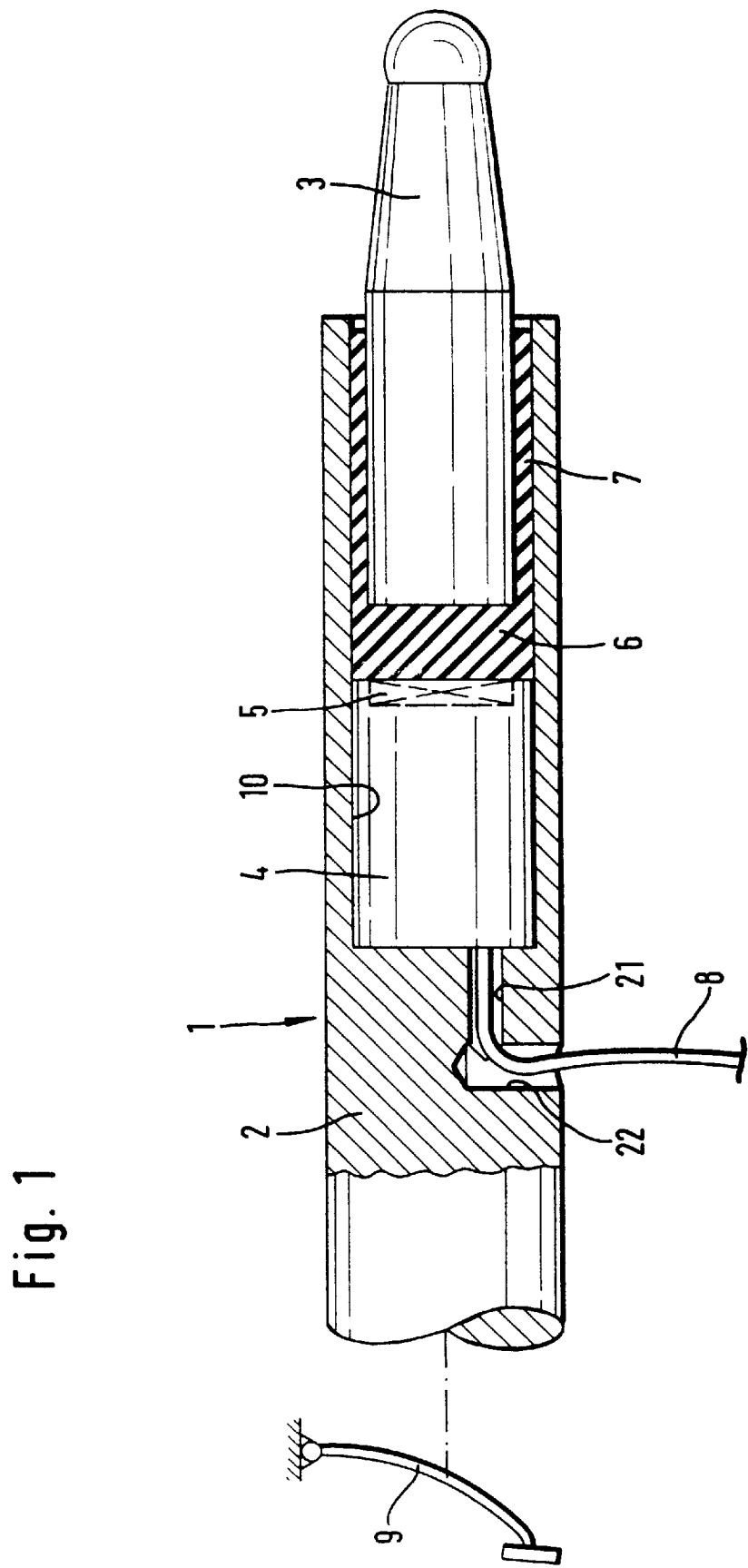

FIG. 1 shows an actuating rod 1 of a pneumatic brake power booster (not shown) which is connected to an actuating pedal (illustrated only schematically), preferably a brake pedal 9. The actuating rod 1 has a two-part design. One part or stem 2 is coupled to the brake pedal, and a second part or peak 3 is partly accommodated telescopically in a cylindrical bore 10 provided on the end of the stem 2 remote from the brake pedal. The peak 3 can be in force-transmitting connection with a valve piston (not shown) of a pneumatic control valve of the brake power booster, for example. In addition, the bore 10 accommodates a pressure generator 4 which, along with its sensor element 5 and the end of peak 3, limits therein a pressure chamber 6. Pressure chamber 6 is filled with a pressure fluid, for example an elastic, but almost incompressible substance 7 (for example, silicone). The sensor element 5 is exposed to the effect of the pressure which develops in the pressure chamber 6 upon actuation and is proportional to the actuating force to be measured. It is suitable that the peak 3 is cemented with the stem 2 by way of the elastic substance 7. In order that electric lines 8 associated with the pressure generator 4 may extend outwardly, passages 21, 22 are provided in the stem 2 which can be configured as two bores that extend vertically relative to each other, for example.

The precondition for the described measurement principle is the development of an isotropic pressure in the pressure chamber 6. For this reason, the ratio between the length of the cylindrical pressure chamber 6 and its diameter must not be too small, and ruptures and gas bubbles in the pressure chamber 6 are undesirable.

To prevent detrimental tensile loads in the pressure chamber 6, a stop 11 limiting the relative movement between the stem 2 and peak 3 is provided in the embodiment shown in FIG. 2. Preferably, the stop 11 has one or more radial indentations 13 at the end of the stem 2. Indentations 13 interact with a flank (shown on the left in the drawing) of a circumferential groove 12 which is provided in the peak 3.

In the third design variation of the subject matter of the present invention shown in FIG. 3, the pressure chamber 6 is limited by a round pressure plate 14 which abuts the end of the peak 3 axially. Preferably, the end of the peak 3 has a hollow design, with the result that a hollow chamber 15 is provided between the peak 3 and the pressure plate 14. When the actuating rod 1 is exposed to tensile load, chamber 15 prevents the transmission of tensile forces to the elastic substance 7 in the pressure chamber 6. This prevents ruptures in the pressure chamber 6. Instead, an axial extension of the hollow chamber 15 causes ruptures which extend from the hollow chamber 15 in a radial direction up to the wall of the bore 10, but do not impair the measurement principle.

Figure 4:
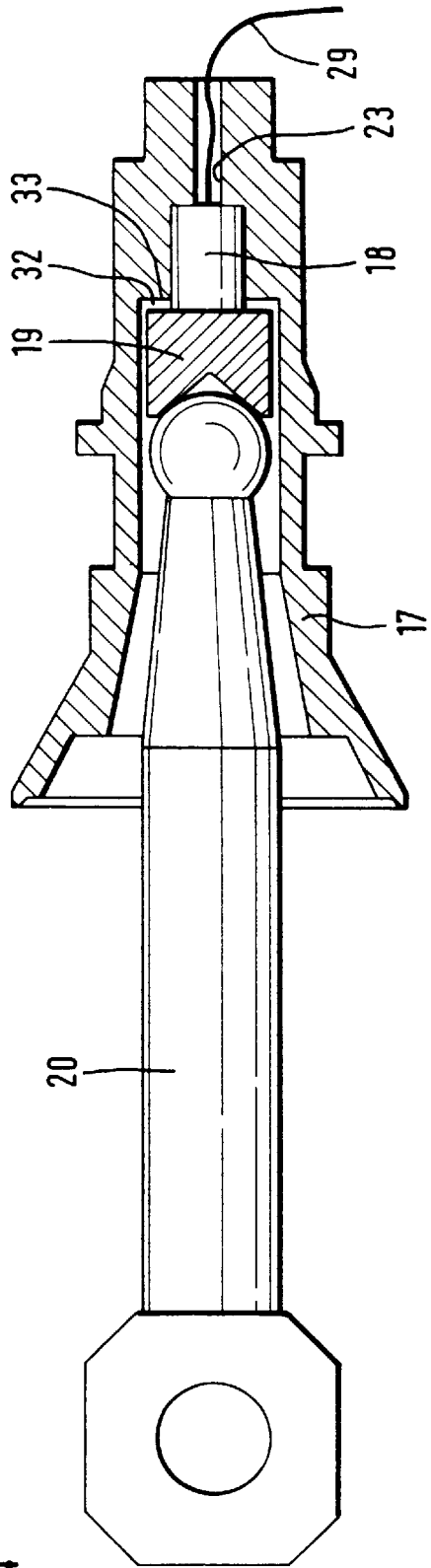
FIG. 4 is a fourth embodiment of the subject matter of the present invention operating according to a different principle.
Figure 5:
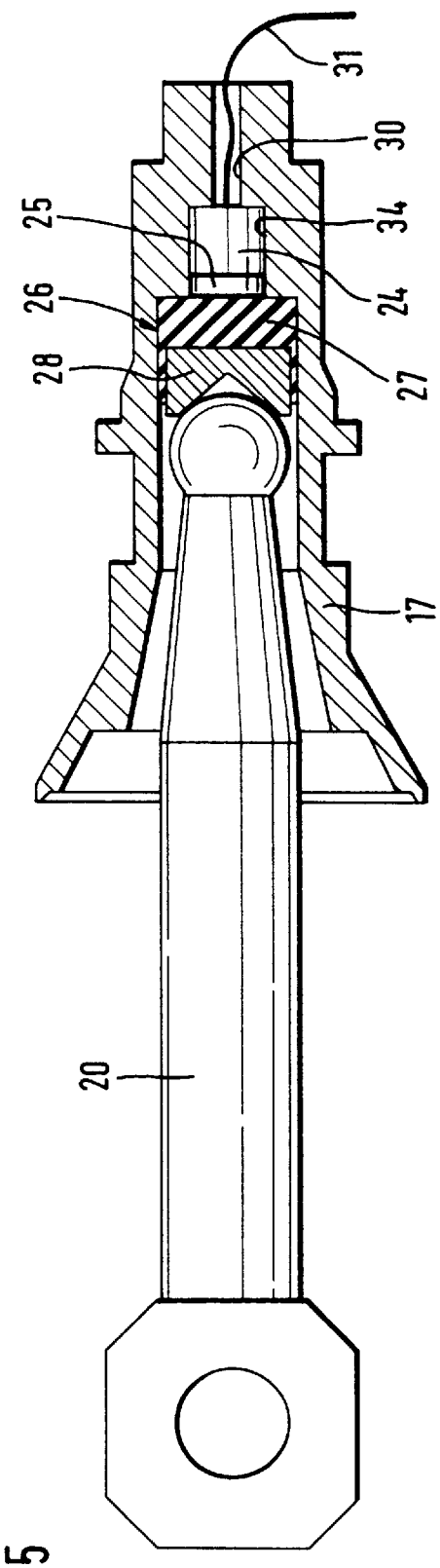
FIG. 5 is a fifth embodiment of the subject matter of the present invention operating according to the principle of FIGS. 1 to 3.

In the embodiments shown in FIGS. 4 and 5, the actuating rod 20 has a one-part design and interacts with a valve piston 17 (shown in a simplified view only) which is used to actuate a control valve not shown. The above mentioned device for determining the input force in the embodiment shown in FIG. 4 is configured as a force generator 18. Force generator 18 is arranged in the valve piston 17 coaxially relative to the actuating rod 20. Forces are transmitted from the actuating rod 20 to the force generator 18 by way of an intermediate piece 19 which, in the inactive position, is spaced an axial distance 32 from an annular surface 33 in the valve piston 17. A through-bore 23 is provided in the valve piston 17 for electric lines 29, associated with the force generator 18, to extend into the inside of the booster housing (not shown).

The assembly shown in FIG. 5 generally operates according to the same principle which was explained in connection with FIGS. 1 to 3. To this end, a pressure generator 24 is arranged in a cylindrical recess 34 of the valve piston 17. The sensor element 25 of pressure generator 24 can be acted upon by the pressure which develops in a pressure chamber 26 upon actuation. Preferably, the pressure chamber 26 is filled with an elastomer 27 and limited by a pressure member 28 against which the end of the actuating rod 20 comes to bear. Exactly as in the embodiment shown in FIG. 4, electric lines 31 associated with the pressure generator 24 can extend through a bore 30 in the valve piston 17 into the interior of the booster housing.

It is appropriate to form assembly units to achieve the arrangements shown in FIGS. 4 and 5. For example, the intermediate piece 19 and the force generator 18, or the pressure member 28, elastomer 27 and pressure generators 24, 25 can be combined in preassembled units.

We claim:

1. A brake power booster including a bipartite actuating rod which is in force-transmitting connection with an actuating pedal and has a first and a second part telescopically slidable in each other, and a device for determining an input force, applied to the actuating pedal, which is interposed between the two parts, the first part being connected to the actuating pedal and including a bore, wherein the device for determining the input force is provided by a pressure generator which interacts with a pressure chamber that is filled with an elastic substance and is limited radially by the bore, and wherein the second part is a peak actuating a valve piston of a control valve of the brake power booster, the peak limiting the pressure chamber axially and being cemented to the stem by the elastic substance wherein the first part is a stem including a stop which permits entrainment of the peak when the actuating rod is subjected to tensile load.

2. The brake power booster as claimed in claim 1, wherein the stop is provided by a sheared-in indentation on the end of the stem remote from the actuating pedal and is engaged in a circumferential groove of the peak.

3. The brake power booster as claimed in claim 1, wherein forces are transmitted from the peak to the elastic substance by way of a pressure plate which abuts the peak axially, the pressure plate along with the hollow end of the peak defining a hollow chamber.

4. The brake power booster as claimed in claim 1, wherein the first part is a stem containing passages which accommodate electric lines leading to the pressure generator.

5. A brake power booster including an actuating rod which is in force-transmitting connection with an actuating pedal, on the one hand, and a valve piston of a control valve, on the other hand, and a device for determining an input force, applied to the actuating pedal, which includes a pressure chamber that interacts with a pressure generator and is filled with an elastic substance, wherein the device for determining the input force is arranged in the valve piston, and wherein forces are transmitted from the actuating rod to the elastic substance by a pressure member axially limiting the pressure chamber.

6. The brake power booster as claimed in claim 5, wherein the valve piston has a bore which accommodates electric lines that lead to the pressure generator.

\* \* \* \* \*